United States Patent [19]

Dean

[11] Patent Number: 4,532,142
[45] Date of Patent: Jul. 30, 1985

[54] AUTOMATIC COFFEE MAKER

[76] Inventor: Lanty W. Dean, 3023 Lincoln Ct., Garland, Tex. 75041

[21] Appl. No.: 551,867

[22] Filed: Nov. 15, 1983

Related U.S. Application Data

[63] Continuation-in-part of Ser. No. 297,953, Aug. 31, 1981, abandoned.

[51] Int. Cl.³ .............................................. A47J 31/00
[52] U.S. Cl. ..................... 426/388; 99/295; 99/307; 99/316; 99/280; 426/433; 426/520
[58] Field of Search ............... 99/280, 281, 282, 283, 99/285, 290, 291, 293, 294, 295, 298, 299, 300, 302 R, 304, 305, 307, 316; 426/432, 433, 434, 308, 388, 520

[56] References Cited

U.S. PATENT DOCUMENTS

| 1,637,286 | 7/1927 | Turner | 99/307 |
| 2,890,643 | 6/1959 | King | 99/283 |
| 3,031,947 | 5/1962 | Heuckeroth | 99/294 |
| 3,291,034 | 12/1966 | Sohn et al. | 99/291 |
| 3,590,723 | 7/1971 | Dokos | 99/299 |

Primary Examiner—Robert W. Jenkins
Attorney, Agent, or Firm—L. Dan Tucker

[57] ABSTRACT

An improved automatic coffee maker includes three separate chambers for heating water, storing brewed coffee at a relatively low temperature, and heating coffee to serving temperature prior to dispensing. The dispensing and water heating chambers preferably share a common wall, and at least a portion of such wall is in contact with the heated water in the water chamber. Heat is transferred through such common wall to heat the coffee in the dispensing chamber prior to dispensing. Means can be included for automatically detecting a low level of coffee in the intermediate storage chamber, and initiating the next brewing cycle.

13 Claims, 4 Drawing Figures

AUTOMATIC COFFEE MAKER

BACKGROUND OF THE INVENTION

This application is a continuation-in-part of U.S. application Ser. No. 297,953, filed on Aug. 31, 1981, now abandoned.

The present invention relates generally to automatic coffee makers and more specifically to a device for storing brewed coffee at a relatively low temperature and reheating it to serving temperature shortly before dispensing.

Coffee is a very popular beverage, and coffee making machines of various types are a fixture in most American homes and offices. An increasingly popular type of machine is an automatic drip coffee maker, which is well accepted because of its simplicity to use, ease of cleaning and quality of product. A typical drip coffee maker sprinkles very hot water over ground or flaked coffee contained in a paper filter, and collects brewed coffee in a container underneath. The container is usually a glass or ceramic coffee pot, which can be placed on a heating element to keep the brewed coffee at serving temperature. Larger coffee makers generally utilize metallic containers for brewing and storing coffee before it is dispensed.

A problem with this type of automatic coffer maker relates to storage of the coffee after brewing. Coffee stored at serving temperature typically has a short pot life. Efforts to lengthen pot life by isolating the brewed coffee from oxygen are only slightly successful. The pot life can also be lengthened somewhat by brewing the coffee very quickly, which can be accomplished by transmitting hot water through a large amount of ground coffee in a short period of time. This process is wasteful of the ground coffee, because up to twice as much must be used to brew an equal volume of liquid coffee as compared with the slow method, and the product quality is lower. The slower brewing method, whereby hot water is sprinkled at a relatively slow rate over the coffee grounds, produces a superior product, but has a pot life on the order of one hour in length when it is stored at serving temperature. The faster brewing method may give a pot life of up to three hours.

In either case, coffee which is stored in a pot at serving temperature for long periods undergoes a marked degradation of quality. Such coffee tends to lose its aroma, color and flavor. Two major reasons for such degradation include oxidation due to contact with air, and scorching due to contact with hot surfaces that maintain the coffee at serving temperature. Of the two, scorching harms coffee quality more than oxidation. Scorching occurs because a small portion of the coffee container must be elevated to a high temperature in order to keep the entire container at serving temperature, which is typically around 180° F. Both of these effects worsen with increasing storage time.

It is therefore an object of the present invention to provide an improved method and coffee making apparatus which uses ground coffee efficiently, provides a superior product, and which can store the brewed coffee for a long period of time without a major degradation of quality.

Therefore, according to the present invention, an improved drip coffee maker includes three chambers. The first chamber is for storage and heating of water prior to brewing. Hot water is taken from this first chamber and sprinkled slowly over coffee grounds to provide efficient use of the coffee grounds and a superior product. After brewing, the coffee passes to a second chamber where it is stored at a temperature substantially below serving temperature. This relatively low temperature decreases the degradation due to oxidation, and eliminates degradation due to scorching as there are no hot surfaces in contact with the stored coffee. A small amount of coffee passes into the third chamber from which it is dispensed as desired. The dispensing chamber can share a common wall with the water heating chamber, and heat passes through such wall into the brewed coffee in the dispensing chamber. This elevates the temperature of such coffee to the desired serving temperature. Since only a small amount of coffee is elevated to serving temperature at any one time, the heat thus transferred need not be great, and the common wall is much cooler than a typical heating element. This effect is similar to that used in a double boiler.

Additionally, scorching is prevented because any particular volume of coffee is in the presence of the relatively warmer common wall for only a short period of time. Therefore, any possible degradation of quality due to the presence of the relatively warmer common wall is kept to a minimum by reducing exposure time to such wall to a minimum.

The novel features which characterize the present invention are defined by the appended claims. The foregoing and other objects and advantages of the invention will hereinafter appear, and for purposes of illustration, but not of limitation, three alternative embodiments are shown in the accompanying drawings.

DETAILED DESCRIPTION OF THE PREFERRED EMBODIMENTS

Figure 1:
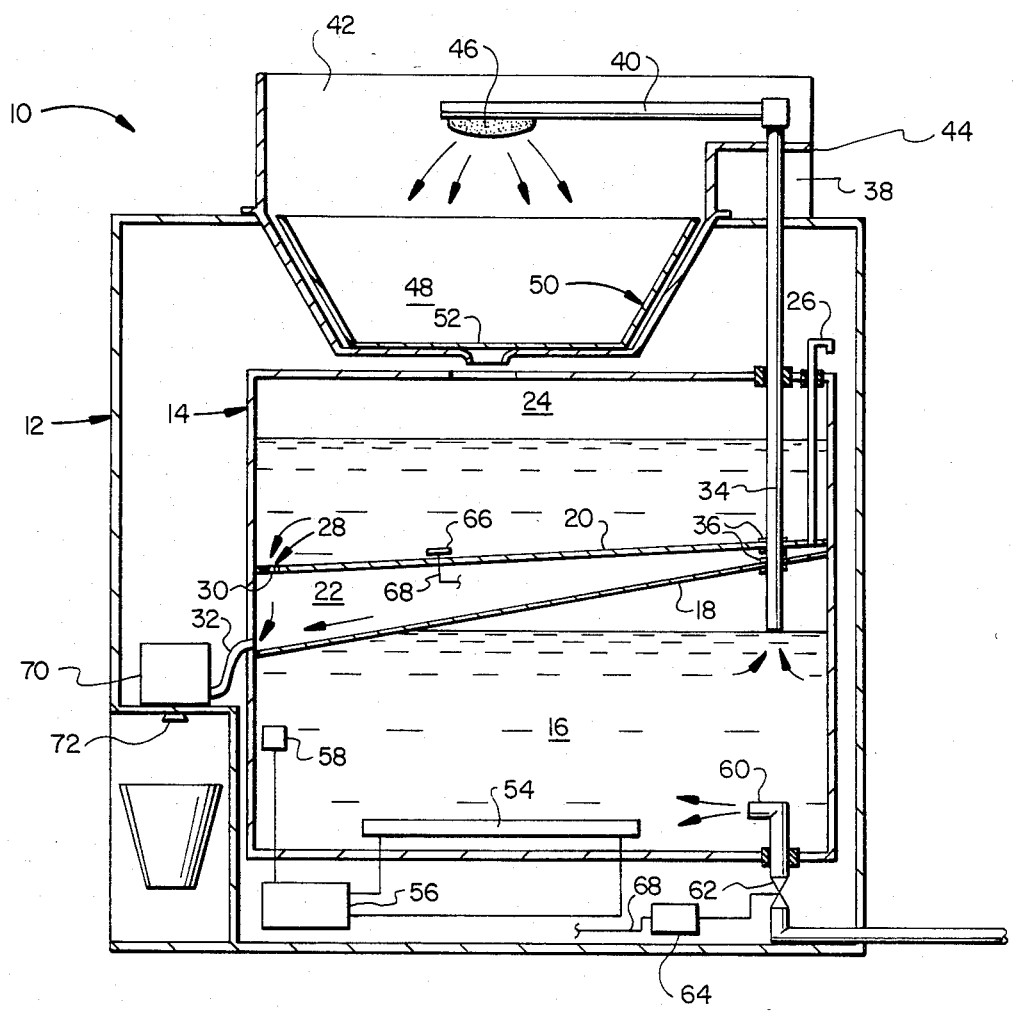
FIG. 1 is a cross-sectional view of a coffee making and dispensing apparatus according to the present invention.

FIG. 1 shows a cross-section of a preferred coffee dispensing apparatus, designated generally by the reference numeral 10. The apparatus 10 has an outer casing 12 which contains internally a fluid tank 14. The fluid tank 14 is divided into three chambers as hereinafter described. A hot water chamber 16 is defined by the tank 14 itself and a lower divider wall 18. The lower divider wall 18 is planar, and attached to the tank 14 around its entire perimeter, thus forming an airtight storage chamber 16. An upper dividing wall 20 is likewise planar and coupled to the tank 14 around its entire perimeter so that a wedge shaped dispensing chamber 22 is formed. The lower wall 18 is coupled to the tank 14 so that it is higher at the back than front, and at an angle from the horizontal greater than that of the upper wall 20, which is likewise attached to the tank 14 at a point which is preferably lower in the front. The upper divider wall 20 additionally defines a coffee storage chamber 24 in the upper portion of the tank 14.

An air vent 26 is located through upper divided wall 20 and is illustrated here as being near the point of the dispensing chamber 22 where the upper and lower divider walls 20, 18 meet, and extends upwardly through the storage chamber 24 and out the top of the tank 14. The air vent 26 is in fluid communication only with the dispensing chamber 22, and not with the storage chamber 24. An opening 28 in the upper divider wall 20 creates fluid communication between the coffee storage chamber 24 and the dispensing chamber 22. Opening 28 is sized such that it is substantially smaller than dispensing tube 32 whereby coffee can be dispensed from storage chamber 22 at a faster rate than it is allowed to enter storage chamber 22 through opening 28. Alternatively, several baffles 30 located in the opening 28 impede the flow of fluid from the storage chamber 22 through a dispensing tube 32 at a greater rate than through the opening 28.

A vertical water transfer pipe 34 opens into the interior of the water chamber 16, and passes upwardly and into fluid communication with a delivery tube and water spray head for distributing hot water over ground coffee during a brewing cycle. In one preferred embodiment, vertical water transfer pipe 34 passes through the dispensing and coffee chambers 22, 24 and out the top of the tank 14. Where it passes through the upper and lower dividing walls 18, 20, the vertical water pipe 34 is tightly sealed with seals 36 so that the connections are water tight. The lower end of the tube 34 is vertically located between the front and rear connection points of the lower divider 18. Since the water chamber 16 is air tight, the air trapped in the upper portions of the chamber 16 will prevent the water level from rising above the lower end of the tube 34. If additional water is transferred under pressure into the chamber 16 when the water level is at the lower end of the tube 34, water will rise vertically up the tube 34. Thus water contained in storage chamber 16 is in contact with only a portion of lower divider plate 18.

In the illustrated preferred embodiment of this invention, the vertical pipe 34 passes through a support member 38 and is rotatably coupled to a horizontal delivery tube 40. The horizontal delivery tube 40 is fixed into a horizontal swinging head 42 which can be pivoted about a pivot bearing 44. The horizontal delivery tube 40 terminates in a conventional spray head 46.

In the upper portion of the outer casing 12, a receiving area 48 is formed to receive a disposable coffee filter 50, preferably made of filter paper. An opening 52 in the bottom of the receiving portion 48 is in fluid communication with the coffee storage chamber 24.

In the water chamber 16, a heating element 54, preferably an electrical resistive heating element, is disposed near the bottom of the chamber 16, and is electrically coupled to a power control circuit 56. A temperature sensor 58 is likewise disposed within the water chamber 16, but nearer to the lower divider wall 18 than the heating element 54, and is likewise coupled to the power control circuit 56. The control circuit 56 causes electrical energy to be applied to the heating element 54 only when the sensor 58 indicates that the temperature of the water in the chamber 16 has dropped below a preset value, and ceases application of energy when the sensor 58 registers that the water has risen above a second selected value.

A water inlet pipe 60 delivers water under pressure into the holding tank 14, and is preferably connected to the standard water supply of a building. A control valve 62 can be either open or shut, and controls the flow of water into the holding chamber 14. The valve 62 is preferably compensated so that water flow is substantially constant regardless of supply pressure. The position of the control valve 62 is controlled by a valve control circuit 64. The valve control circuit 64 can be triggered to operate the valve 62 upon receipt of a signal from a manual switch (not shown), or a fluid sensor 66 disposed within the coffee storage chamber 24 and coupled to the control circuit 64 by a signal line 68. Operation of a preferred control circuit 64 will be discussed in connection with FIG. 3.

Coffee dispensing tube 32 is coupled to a dispensing control device 70. This device 70 may be merely a lever or button operated valve, whereby operation of the lever or button dispenses as much coffee as desired through discharge spout 72 and into a cup or other container. Alternatively, the dispensing device 70 may be a timer controlled valve (not shown), whereby the valve is held open for a predetermined period of time each time it is triggered. This is useful, for example, if the coffee dispenser 10 is to be a coin operated dispenser, and the valve is actuated each time the proper amount of money is put into the dispenser 10.

Figure 3:
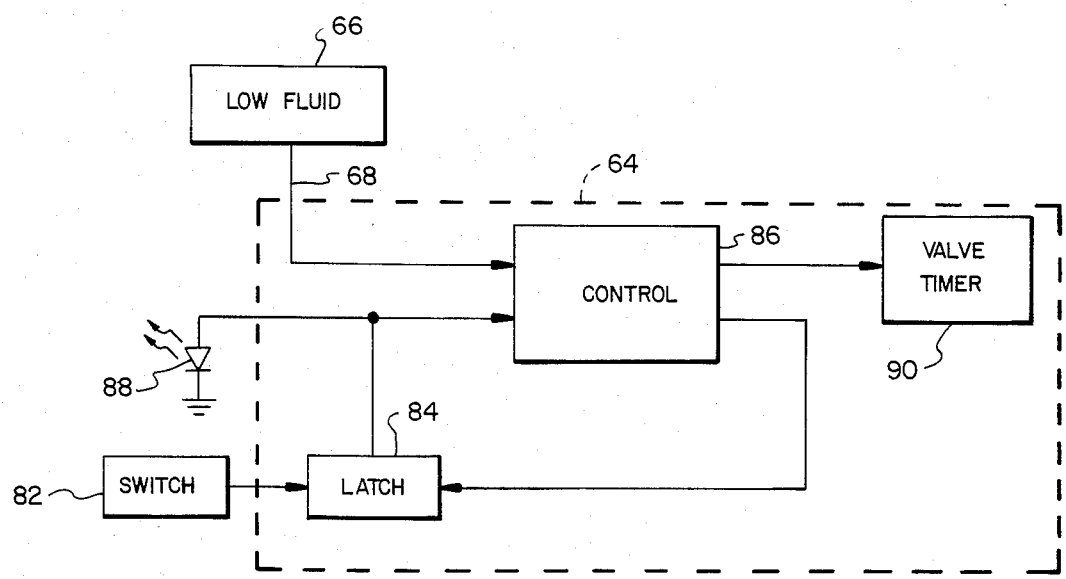
FIG. 3 is a block diagram of a control circuit for use with the present invention.

A preferred embodiment of the valve control circuit 64 is shown in FIG. 3. An auto-brew switch 82 is mounted on the front of the outer casing 12, and electrically coupled to the control circuit 64. The fluid level sensor 66 is coupled to the control circuit 64 by signal line 68 as described in connection with FIG. 1.

Within the control circuit, the connection from the brew switch 82 is coupled to a latch 84, such as an SR flip-flop or self-latching relay. When the switch 82 is depressed, the latch 84 switches to a logical ON state. This gives an input signal to an electronic control 86, and causes indicator 88, which can be an LED, incandescent lamp or other suitable indicator, to turn on. The output of the control 86 is low unless signals are received from both the latch 84 and the low fluid indicator 66. Thus, the automatic brewing feature is enabled only when the brew switch 82 has been depressed. When both signals are received, the control 86 starts a valve timer 90 and resets the latch 84. The valve timer 90 opens the valve 62 for a preset period of time.

In operation, it is generally presumed that water will be contained at all times within the holding tank 16. When the apparatus is turned off at night, the valve control circuit 64 is disabled, so that no additional water will be input to the holding tank 16. The coffee remaining in the storage and dispensing chambers 24 and 22 can then be drained off so that the chambers 24, 22 are empty. In the morning, the apparatus is turned on, which causes the heating element 54 to be energized. An indicator light (not shown) can be coupled to the power control circuit 56 and mounted on the front of the casing 12, so that when the water in the holding chamber 16 reaches the proper temperature, the indicator light will be activated. An operator then pushes the brew switch 82, which sets the latch 84 to a high output. Since the fluid sensor 66 is uncovered, the control 86 will start the valve timer 88, which changes the control valve 62 to the open position, and water begins to flow into the water holding chamber 16. Opening of the valve 62 initiates the coffee brewing cycle. Since the topmost portion of chamber 16 is airtight and water cannot rise above its present level, as discussed above, hot water, taken from the upper levels of that in the holding chamber 16, rises through the vertical pipe 34 at a rate equal to the water flowing in through the supply line 60. This flow rate is preferably slow, so that the coffee is brewed slowly. The valve timer 88 can be manually preset so that the control valve 62 will remain open for various lengths of time. This allows the operator to elect to brew, for example, either one or two gallons of coffee at a time. It will be appreciated that this feature will also allow the apparatus to brew either strong or weak coffee when a predetermined amount of ground coffee is added to the coffee receiving area.

The heated water rises through the vertical pipe 34, and passes through the horizontal pipe 40 and out the spray head 46. The water slowly percolates through coffee grounds which have been previously placed in the receiving area 48, and passes through the opening 52 as brewed coffee. The coffee proceeds to fill up the dispensing chamber 22, followed by the coffee storage chamber 24. The air vent 26 prevents air from being trapped in the dispensing chamber 24. Coffee will continue to be brewed until the valve timer 90 shuts the supply valve 62. Brewed coffee is available at the output spout 72 as soon as it is available in the dispensing chamber 22, and it is unnecessary to wait for the entire brew cycle to be completed. Since the fluid sensor 66 will now be immersed in fluid, the valve control circuit 64 will not be triggered to begin another brew cycle. This feature will prevent accidental overflow of coffee if an operator attempts to initiate another brew cycle before the level of coffee in storage chamber 24 falls below the level of fluid sensor 66.

As soon as the brewing cycle is completed, the operator may turn the pivoting member 42 to the side and lift out and dispose of the used filter 50 and coffee grounds. At this time, a new filter 50 and portion of ground coffee may be placed in the receiving area 48, and the upper head 42 pivoted back to the normal position. The brew switch 82 is depressed, setting the latch 84 and lighting the indicator 88. When indicator 88 is lit, the user knows that the automatic brew feature is operational. When the fluid level in the coffee storage chamber 24 drops to a point low enough to trigger the fluid sensor 66, a new brewing cycle will automatically begin. In this way, a supply of coffee is always ready in the apparatus 10. When the timer 90 is triggered to begin a new brewing cycle, the latch 84 is reset and the indicator 88 goes out. When indicator 88 is out, the user knows that a new filter 50 and ground coffee should be placed in the receiving area 48, and the brew switch 82 depressed to set the next automatic brewing cycle.

With the apparatus and method of this invention, coffee is always dispensed hot, but is primarily stored at a temperature lower than the usual serving temperature. The water in the storage chamber 16 is preferably thermostatically controlled to be approximately 210° F. The coffee is brewed at this desired elevated temperature, and then passes into the coffee storage chamber 24 and dispensing chamber 22. The dispensing chamber 22 shares a divider wall 28 with the water storage chamber 16, and the water level in the storage chamber 16 is chosen to be such that a portion of this divider wall 18 is contacted by hot water on the lower side, as illustrated in FIG. 1. The surface area of the divider 18 so contacted is determined by the length of the vertical pipe 34 projecting into the water chamber 16. This common wall 18 is made of a material that conducts heat from the heated water in storage chamber 16 to the coffee in the dispensing chamber 22. This keeps the coffee in the dispensing chamber 22 at the desired serving temperature of approximately 180° F. If desired, the upper divider wall 20 can be chosen from a material whch is a poorer heat conductor, so that the temperature of the coffee in the coffee holding chamber 24 is approximately 150° F. or less. In some instances it may be desirable to insulate or actually separate upper coffee holding chamber 24 from coffee dispensing chamber 22 in order to maintain the coffee in chamber 24 at temperatures of 150° F. or less for long periods of time. The dispensing chamber 22 is small relative to the coffee holding chamber 24, so that only a small amount of coffee is stored at an elevated serving temperature at any particular time. This coffee is generally dispensed in a relatively short time, so that no volume of fluid is stored at an elevated temperature for extended periods of time. Storage at the lower temperature in the coffee chamber 24 allows the coffee to keep the desired aroma, color and taste for extended periods of time. Coffee may be stored in the coffee chamber 24 for more than ten hours without becoming discolored or bitter.

The coffee in the dispensing chamber 22 retains its color and flavor because no air is present to cause oxidation, and no heating element is directly present to cause scorching. Oxidation is a significant factor primarily at higher temperatures, especially when the coffee is maintained at high temperatures for long periods of time. The lower temperatures in this storage chamber 24, and the lack of air in the dispensing chamber 22, minimize the damage due to oxidation. Coffee in the dispensing chamber 22 is not scorched because heat is transferred only indirectly from the heating element in a manner similar to a double boiler. While the divider 18 is warm enough to keep the small amount of coffee in the dispensing chamber 22 at serving temperature, it is not hot enough to cause scorching.

When the dispenser device 10 is operated, a timer (not shown) is preferably operated so that a valve in the dispensing line 32 is open for a fixed period of time. This would result in a variable volume of coffee being dispensed if the pressure head in the dispensing chamber 22 was allowed to vary with the depth of fluid in the coffee storage chamber 24. The small size of opening 28 and/or baffles 30 in the opening 28 between the storage and dispensing chambers 24, 22 causes fluid to flow into the dispensing chamber 22 at a slower rate than it exits therefrom through the dispensing line 32. This causes the pressure head at the dispensing line 32 to be only that caused by the fluid in the dispensing chamber 22. After the dispensing timer cuts off the flow through dispensing line 32, coffee will continue to flow through the opening 28 until the dispensing chamber 22 is again full.

Figure 2:
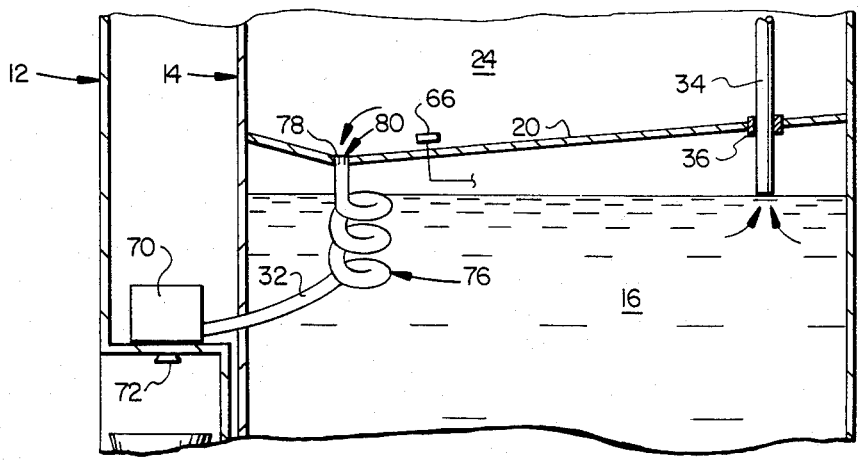
FIG. 2 is a cross-sectional view of a portion of an apparatus according to the present invention showing an alternate embodiment of a dispensing chamber.

An alternative embodiment of the dispensing chamber 22 is shown in FIG. 2. Instead of being a wedge shaped region defined by two dividing walls, the alternate dispensing chamber 76 is basically a helical heat exchanger. The theory of operation is virtually identical to that described in connection with FIG. 1. Only two or three cups of coffee are heated to serving temperature by heat exchange through the coil of the dispensing chamber 76. When the dispensing control device 70 is operated, hot coffee is delivered to the discharge spout 72. Baffles 78 in the opening 80 into the dispensing chamber 76 cause the flow rate out of the dispensing chamber 76 to be independent of the pressure head due to fluid depth in the coffee storage chamber 24 as discussed above. It will be recognized that the use of baffles 28, 78 is not necessary in all instances.

This embodiment has the same advantages as the apparatus of FIG. 1, in that coffee can be stored for extended periods at low temperatures in the dispensing chamber 24, and heated to serving temperature in the dispensing chamber 76. The double boiler effect prevents scorching of the hot coffee in the dispensing chamber 76 in the same manner as discussed in connection with FIG. 1.

Figure 4:
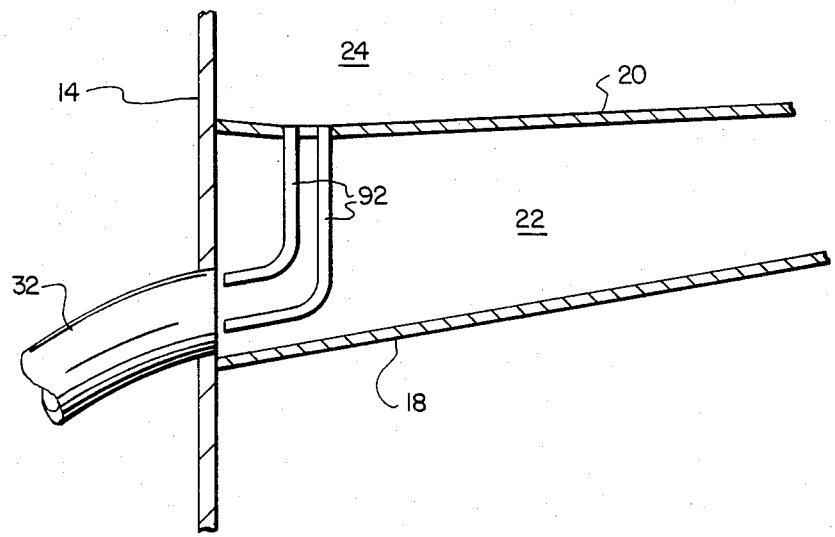
FIG. 4 is a cross-sectional view of a portion of an apparatus according to the present invention showing an alternate embodiment of a dispensing chamber.

An alternative embodiment of the device of FIG. 1 is shown in FIG. 4. This embodiment is identical to that described previously except for the opening 28 between the storage chamber 24 and the dispensing chamber 22, and the dispensing tube 32. Two nozzles 92 depend from the lowest point of the divider wall 20 and are aimed into the dispensing tube 32. When the dispensing control device 70 is operated, coffee flows into the dispensing tube 32 from both the dispensing chamber 22 and the storage chamber 24. By varying the size and number of nozzles 92, the proportion of coffee dispensed from the chambers 22 and 24 can be varied. As described above, the temperature in the dispensing chamber 22 is approximately 180° F., while that in the storage chamber is approximately 150° F. The nozzles 92 are preferably sized so that coffee flowing into the dispensing tube is proportioned approximately 60–65% from the dispensing chamber 22 and 34–40% from the storage chamber. This results in coffee being dispensed at approximately 165° F. Changing the flow proportions, or the storage temperature in either chamber 22, 24 will vary the temperature of the dispensed coffee.

In still another embodiment of my invention, coffee can be brewed extra strong and stored at low temperature in storage chamber 24. Then when the coffee is dispensed in seving sized portions, it can be mixed with a predetermined amount of hot water to dilute the prebrewed extra strength coffee and heated to serving temperature. In such instances, the hot water could be dispensed through nozzles such as nozzles 92, depicted in FIG. 4, but with the nozzles being in communication with a hot water source such as coils running through hot water storage chamber 16. In some instances, it may be desirable to eliminate dispensing chamber 22 and merely mix the extra strength coffee from low temperature chamber 24 with hot water to dispense the service sized portions at the desired strength and temperature.

Although preferred embodiments have been described in detail, it should be understood that various substitutions, alterations, and modifications may become apparent to those skilled in the art. These changes may be made without departing from the spirit and scope of the invention as defined by the appended claims.

I claim:

1. An improved coffee dispensing apparatus, comprising:
   a heated water storage chamber;
   means, in fluid communication with said water storage chamber, for brewing coffee;
   a low temperature coffee storage chamber in fluid communication with said coffee brewing means;
   a heated dispensing chamber in fluid communication with said coffee storage chamber; and
   means for dispensing coffee from said dispensing chamber wherein said dispensing means comprises mixing means for dispensing low temperature coffee from said coffee storage chamber mixed with heated coffee from said dispensing chamber in a predetermined ratio.

2. The apparatus of claim 1, further comprising means for keeping water in said water storage chamber at an elevated, substantially constant temperature.

3. The apparatus of claim 1 further comprising:
   a valve coupled to a water supply under pressure, said valve in fluid communication with said water storage chamber;
   control means coupled to said valve for opening and closing said valve, said control means including a timer wherein said valve is opened for a predetermined, controllable period of time when a trigger signal is received; and
   sensor means coupled to said control means for generating the trigger signal when said coffee storage chamber is nearly empty.

4. The apparatus of claim 1, wherein said dispensing means includes means for delivering coffee for a predetermined period of time.

5. The apparatus of claim 1, wherein said dispensing chamber is generally wedge-shaped.

6. The apparatus of claim 1, wherein said dispensing chamber comprises a tube formed into a generally helical shape.

7. The apparatus of claim 1, further comprising a flow restrictor disposed within the fluid communication between said coffee storage chamber and said dispensing chamber.

8. The apparatus of claim 1 wherein said mixing means comprises at least one nozzle in fluid communication with said coffee storage chamber, and having an outlet in near proximity to a dispensing tube, wherein the dispensing tube is in fluid communication with said dispensing chamber.

9. The apparatus of claim 1, further including
   means coupled to said low temperature coffee storage chamber for generating a signal indicating a low fluid level in said low temperature coffee storage chamber; and
   control means coupled to said signal generating means and to said brewing means for initiating a brewing cycle when a low fluid level exists in said low temperature coffee storage chamber.

10. An apparatus according to claim 9, further comprising a switch coupled to said control means, wherein the brewing cycle will only be initiated when said switch is activated and a low fluid level exists.

11. An improved method for dispensing coffee, comprising:
   heating water to an elevated temperature;
   brewing coffee with the water from said heating step;
   storing coffee at a temperature below serving temperature;
   raising the temperature of a relatively small amount of coffee to serving temperature;
   dispensing a portion of the coffee which has a raised temperature;
   dispensing a portion of the coffee which is stored below serving temperature; and
   mixing both dispensed portions in a predetermined ratio prior to delivery of the coffee.

12. The method of claim 11, wherein said dispensing step occurs relatively soon after said temperature raising step.

13. The method of claim 11, wherein said brewing step includes:
   transmitting heated water through ground coffee; and
   collecting the resulting liquid coffee.

* * * * *